No. 725,763. PATENTED APR. 21, 1903.
LA VERNE W. NOYES.
MANUFACTURE OF CAGES FOR ROLLER BEARINGS.
APPLICATION FILED OCT. 1, 1897.
NO MODEL. 2 SHEETS—SHEET 1.
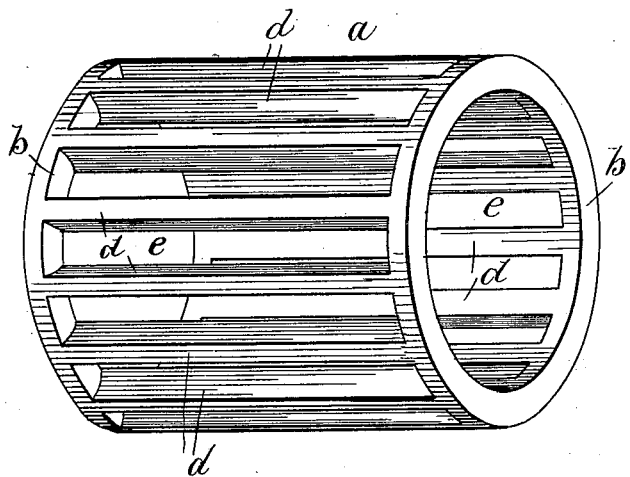
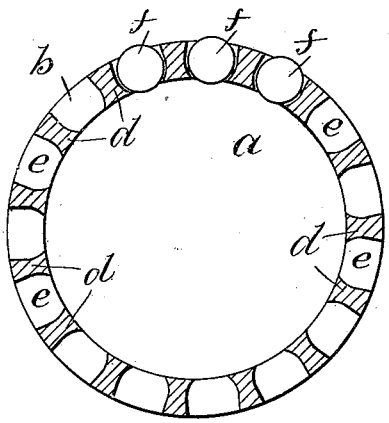
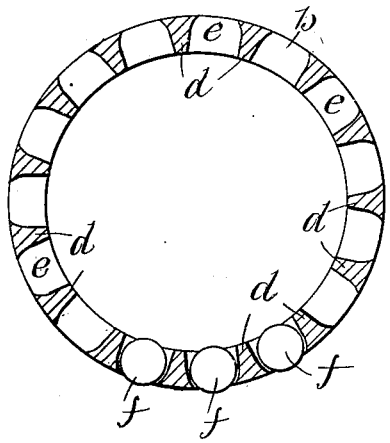
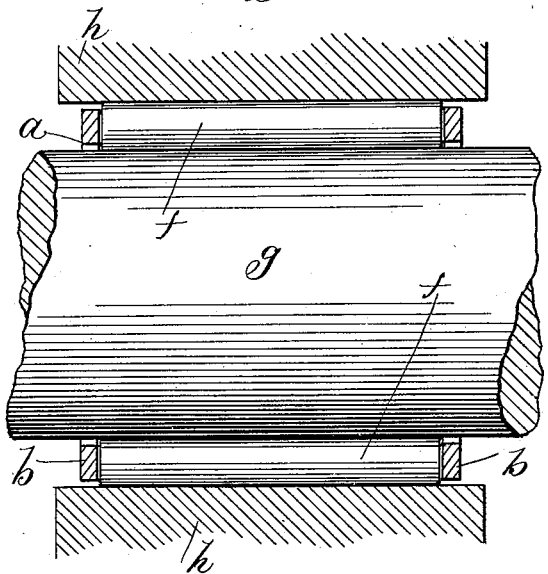
Witnesses:
W. J. Jacker.
M. R. Rochford.
Inventor:
La Verne W. Noyes
By Ludington & Jones.
Attorneys.

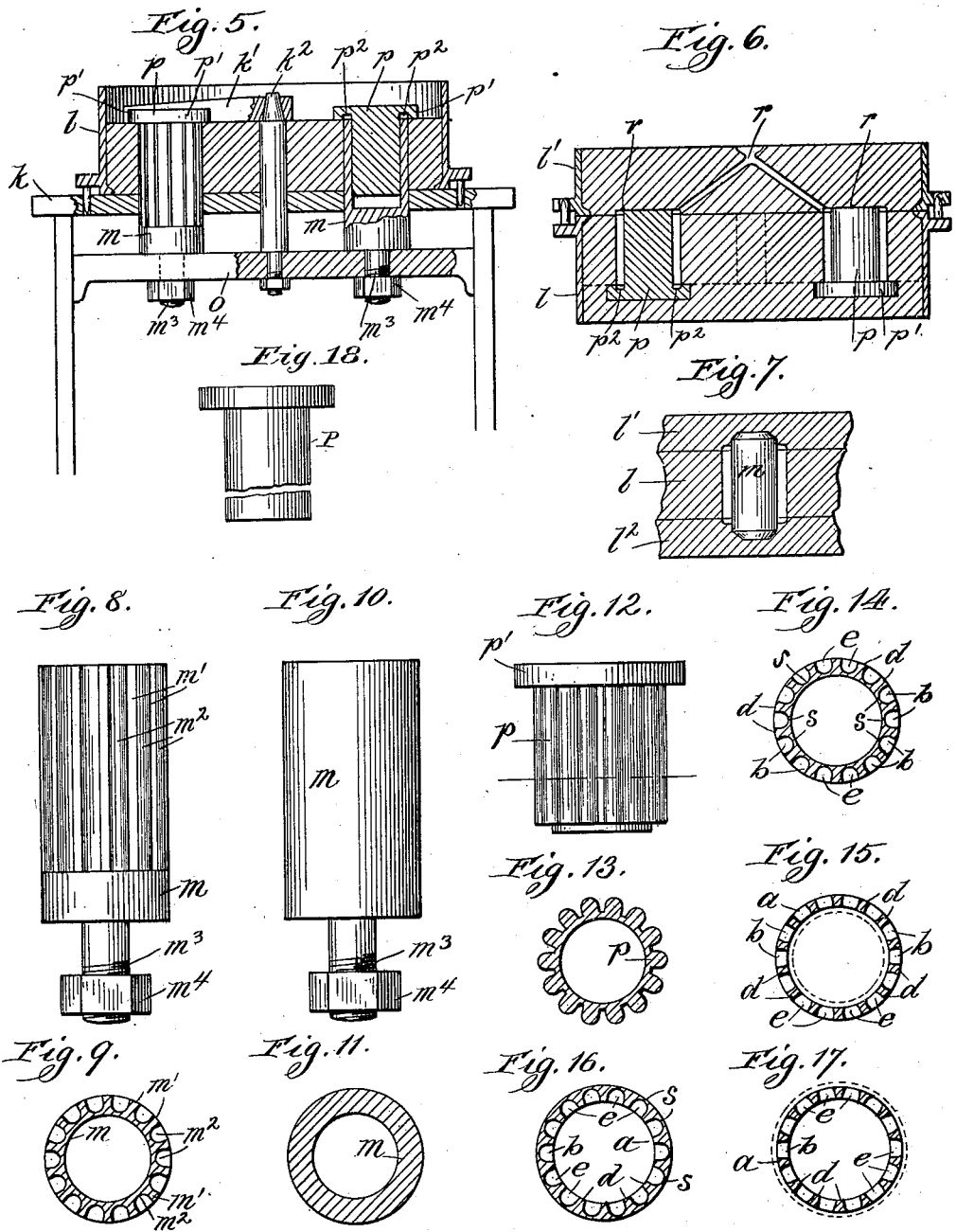

UNITED STATES PATENT OFFICE.

LA VERNE W. NOYES, OF CHICAGO, ILLINOIS.

MANUFACTURE OF CAGES FOR ROLLER-BEARINGS.

SPECIFICATION forming part of Letters Patent No. 725,763, dated April 21, 1903.

Application filed October 1, 1897. Serial No. 653,671. (No model.)

*To all whom it may concern:*

Be it known that I, LA VERNE W. NOYES, a citizen of the United States, residing at Chicago, in the county of Cook and State of Illinois, have invented a certain new and useful Improvement in the Manufacture of Cages for Roller-Bearings, of which the following is a full, clear, concise, and exact description, reference being had to the accompanying drawings, forming a part of this specification.

My invention relates to the manufacture of cages for roller-bearings, my object being to provide an improved process whereby such cages can be manufactured at a much less cost than has been possible heretofore, thereby increasing the utility of roller-bearings and permitting the same to be used in many classes of work where the cost is now prohibitive.

A further object of my invention is to provide a cage which will be absolutely rigid and effectively prevent any twisting or torsional movement of the rollers.

Cages for roller-bearings are formed in the shape of a hollow cylinder or shell having a series of parallel longitudinal slots or channels passing therethrough, within which slots or channels the rollers rest, the diameter of the rollers being slightly greater than the thickness of the cage, whereby the peripheries of the rollers extend beyond the exterior and interior surfaces of the cage. The cage is placed between the journal and its bearing, and the opposite parts of the peripheries of the rollers engage, respectively, the journal and the bearing.

Great difficulty has been experienced in producing a cage possessing the necessary rigidity to prevent the twisting of the rollers, thereby producing a torsion on the rollers which materially increases the friction of the bearing. Cages have heretofore been constructed by providing a hollow cylinder or shell of metal and boring a series of longitudinal holes therein from one end to permit the insertion of the rollers. These cages are objectionable, since they are very difficult to make, it being almost impossible to bore a true hole through the metal, which is narrower than the diameter of the drill. To bore the holes, it is necessary to employ a highly-skilled mechanic, which greatly increases the cost of production. In order to obviate this difficulty in boring the holes, it has been proposed to form the shell of a greater thickness than the diameter of the drill and then to turn down the exterior and the interior surfaces of the shell; but this necessitates considerable machine-work, which is always expensive. Furthermore, the boring of holes from one end of the shell removes the metal from between the ends of the bars formed between the holes and slots and necessitates the employment of a cap upon the end of the shell to secure the ends of the bars together; but any cap so applied does not prevent the springing of the shell, thus subjecting the rollers to the objectionable torsion and consequent increase of friction. In some cases a flange is provided at the end of the shell from which the holes are bored; but the boring of the holes necessarily weakens the shell and permits springing, and even then it is necessary to provide a cap on the end of the shell to prevent the rollers from falling out. Furthermore, the provision of the flange necessitates the boring out of a portion of the bearing to which it is applied, which is objectionable.

To prevent the springing of the bars of the cage, it has been proposed to provide projections upon the end cap to fit between the free ends of the bars and hold them against springing. This further increases the cost of manufacture and is not wholly effective. It has also been proposed to mold the bars and end rings separately, mill the edges of the bars, and then braze or otherwise secure the parts together. This is a very expensive process, necessitating the tooling of each individual piece and skill in the assembling of the parts.

In accordance with the present invention the cage instead of being formed in several pieces adapted to be assembled and secured together is formed in a single and integral piece, the end portions or rings being formed integral with the longitudinal bars, whereby all tendency of the cage to spring is avoided.

Cages have heretofore been cast with end rings and longitudinal bars extending between the same; but it has not been practical according to the methods of the prior art to cast the cage with the faces of the longitudinal bars truly parallel, thus resulting in a crude product inapplicable where accurate bearings are required and necessitating the tooling of the bars in order to bring the bearing-faces thereof into alinement.

In accordance with the process of the present invention the cages may be formed with the bearing-faces of the bars truly in alinement in the first instance.

In practice I form the cage of cast metal and mold the same in a single and integral piece, with the slots or channels formed to receive the rollers laterally. An essential requirement in cages for roller-bearings is that the faces of the longitudinal bars shall be parallel and true in alinement; otherwise the rollers will assume an angular position and being thus subjected to torsion will increase the friction of the bearing. In casting the cages with the longitudinal bars and channels I have experienced great difficulty in procuring a true alinement of the bars, which must necessarily be quite thin in order to provide for the requisite number of rollers. I have completely overcome the tendency of the bars to warp or get out of alinement during casting by providing upon the casting a thin film of metal on either the exterior or the interior face of the shell, which during casting and subsequent cooling holds the thin bars truly in alinement and prevents their warping or getting out of shape. The film of metal is subsequently cut away by turning in a lathe or otherwise, thus leaving the bars separated and perfectly straight.

It is desirable in order to procure a cheap and effective structure to so cast the cage that the side faces of the bars against which the rollers rest will need little or no tooling. The cooling of cast-iron after casting chills the surface of the metal, thus producing a hard surface admirably adapted to withstand the wear of the rollers, and by casting the shell with the film of metal on one surface the bars are prevented from warping, and the rollers thus fit in position between the cast and hardened faces of the bars, and machine-work to bring these bearing-surfaces to alinement is not required. The channels are preferably so formed in the shell that when the film of metal is removed the width of the channels at this face of the shell will be less than the diameter of the roller, while the width of the channel at the other face is sufficient to admit the roller laterally, being so cast in the first instance. The only tooling necessary after the casting is thus to turn or otherwise cut off the film of metal, which can be done at a very small cost. An article of manufacture thus results which can be made at a cost which is hardly comparable with the cost of cages of the prior art which have required a great deal of machine-work and highly-skilled labor in their production. A cage of equal effectiveness which according to the method of manufacture of the prior art has cost several dollars can be formed in accordance with the present invention for a few cents.

I have illustrated my invention in the accompanying drawings, in which—

Figure 1 is a view in perspective of the cage made according to my invention. Fig. 2 is a cross-section thereof. Fig. 3 is a cross-section of a modification. Fig. 4 is a longitudinal section showing the cage and rollers applied to a bearing. Fig. 5 is a sectional view of a portion of the mold in which the cage is cast. Fig. 6 is a view of the completed mold. Fig. 7 is a view of a modified form of mold. Fig. 8 is a view of the pattern. Fig. 9 is a sectional view thereof. Fig. 10 is a view of a modified pattern. Fig. 11 is a sectional view thereof. Fig. 12 is a view of a modified core-piece. Fig. 13 is a sectional view thereof. Fig. 14 is a sectional view of the casting before the film is cut away. Fig. 15 is a sectional view thereof after the removal of the film. Figs. 16 and 17 are sectional views of a modified form of casting before and after the film is removed. Fig. 18 is a view of a core having a plain surface used in connection with the pattern shown in Figs. 8 and 9.

Like letters refer to like parts in the several figures.

The shell or cage $a$ is formed in a single and integral piece and comprises the end rings $b\,b$, between which extend the longitudinal bars $d\,d$, in the channels or slots $e\,e$ between which the rollers $f\,f$ are adapted to rest, the opposite faces of the rollers projecting, respectively, beyond the exterior and interior faces of the cage. As shown in Fig. 2, the slots $e\,e$ are of sufficient width on the exterior face of the shell to permit the lateral insertion and removal of the rollers, while the width of the slots on the interior face of the shell is less, to thereby prevent the passage of the rollers therethrough.

In Fig. 3 is shown a modification wherein the slots are of the greater width on the interior surface and of the less width on the exterior surface.

In Fig. 4 the cage and rollers are shown as interposed between a journal $g$ and a bearing $h$.

In molding the cage I place upon the stripper-board $k$ of a molding-machine a flask $l$, and passing through the stripper-board and extending into the flask are a plurality of patterns $m\,m$. I preferably cast six of the cages in one flask, the patterns being arranged in a circle about a common center. The drawings illustrate the two patterns situated in diametrically opposite positions. Each pattern comprises a cylinder the sides of which are fluted, as shown in Figs. 8 and 9, to form a series of alternate ridges $m'\,m'$ and depressions $m^2\,m^2$ between the same. The lower ends of the patterns are secured to a cross-piece $o$, which can be raised and lowered at will by any preferred mechanism. The patterns are shown as having threaded shanks $m^3$ $m^3$ passing through the cross-piece $o$ and having nuts $m^4$ $m^4$ screwing upon the ends thereof. The patterns being in the positions illustrated in Fig. 5, the flask is filled with sand to a level with the upper ends of the patterns and is smoothed off by means of the arm $k'$, removably pivoted upon stud $k^2$, passing through the stripper-plate $k$ and secured to the cross-piece $o$. The cores $p\,p$, formed with a plain surface, (see Fig. 18,) are then placed in position, with the bodies thereof fitting within the bores of the respective patterns and the heads or flanges $p'$ resting upon the surface of the sand, the end of the body of the core extending a short distance below the surface of the stripper-plate. The core is provided with a groove $p^2$ on the under face of the head adjacent to the body of the core. The arm $k'$ is removed and the patterns are now withdrawn from the sand by the lowering of the cross-piece $o$, thus lowering the patterns and withdrawing them to a position beneath the face of the stripper-plate. The stud $k^2$ is at the same time withdrawn from the flask. The flask $l$ is filled with sand above the core-pieces and then removed from the stripper-plate and placed in a reversed position, as shown in Fig. 6. Upon the top of the flask $l$ is placed a second flask $l'$, and in the face of the sand therein a series of depressions $r\,r$ are formed in any suitable manner—as, for instance, by small patterns of disk shape pressed into the sand in the face of the box $l'$—and one of these depressions rests above each of the cores when the flask is placed in position upon flask $l$. The projecting end of the core rests against the bottom of the depression, which is of a larger diameter than the core, and a channel is thus left around the core. The metal is then poured in through the passage $r'$, and the casting produced is of the form illustrated in section in Fig. 14. The interior of the casting is then turned or bored out to remove the film of metal $s$ between the longitudinal bars $d\,d$, joining the end rings $b\,b$ to produce the completed cage illustrated in Figs. 1, 2, and 15. The form of the casting before and after the film is removed is illustrated in Figs. 14 and 15.

Instead of casting the cage with the longitudinal bars joined together by the film of metal on the inner face the film of metal may be formed on the outer face of the shell, as shown in Fig. 16. In this case the pattern will have the form shown in Figs. 10 and 11, and the core used in connection therewith will be formed with longitudinal ridges and channels on the face thereof, as shown in Figs. 12 and 13. The casting before and after the removal of the film is shown in Figs. 16 and 17.

In Fig. 7 is illustrated a modified form of mold, in which three flasks $l\,l'\,l^2$ are employed, the molds in flask $l$ being formed with the pattern, as above described, the end flasks $l'$ $l^2$ being then placed in position, with the core supported in the end flasks and the annular channels formed in the sand of the flasks $l'\,l^2$.

Having described my invention, what I claim as new, and desire to secure by Letters Patent, is—

1. As a new article of manufacture, a cage for roller-bearings formed from a single piece of cast metal of annular form having longitudinal grooves extending inward from the surface on one side and having on the other side when cast a thin film of metal, which film is removed by mechanical means after the cast metal has cooled to leave a series of longitudinal channels extending through the walls of the cage, separated by bars having their adjacent sides consisting of the natural skin of the casting whereby good wearing-surfaces are obtained, substantially as described.

2. The herein-described method of forming cages for roller-bearings which consists in casting molten metal into the form of an annular shell having longitudinal grooves extending inwardly from the surface on one side and having on the other side a thin film of metal, cooling the metal and then removing the film by mechanical means, the channels extending through the cage formed by removing the film being separated by bars having their adjacent sides consisting of the natural skin of the casting whereby good wearing-surfaces are obtained, substantially as described.

3. As a new article of manufacture, a cage for roller-bearings formed from a single piece of chilled cast metal of annular form and having longitudinal parallel bars forming the walls thereof, the surfaces of the adjacent sides of said bars consisting of the natural skin of the casting whereby good wearing-surfaces are obtained, and the outer surface thereof having the said skin removed, substantially as described.

In witness whereof I have hereunto subscribed my name in the presence of two witnesses.

<div style="text-align:center">LA VERNE W. NOYES.</div>

Witnesses:
  W. CLYDE JONES,
  M. R. ROCHFORD.